United States Patent
Thackston

(10) Patent No.: US 12,231,533 B1
(45) Date of Patent: Feb. 18, 2025

(54) DATA SECURITY USING FRAGMENTED CIPHERTEXT

(71) Applicant: James D. Thackston, St. Petersburg, FL (US)

(72) Inventor: James D. Thackston, St. Petersburg, FL (US)

(*) Notice: Subject to any disclaimer, the term of this patent is extended or adjusted under 35 U.S.C. 154(b) by 320 days.

(21) Appl. No.: 17/591,567

(22) Filed: Feb. 2, 2022

Related U.S. Application Data

(60) Provisional application No. 63/144,833, filed on Feb. 2, 2021.

(51) Int. Cl.
| | |
|---|---|
| *H04L 9/06* | (2006.01) |
| *G06F 21/60* | (2013.01) |
| *H04L 9/08* | (2006.01) |
| *H04L 9/40* | (2022.01) |

(52) U.S. Cl.
CPC .......... *H04L 9/0618* (2013.01); *G06F 21/602* (2013.01); *H04L 9/0822* (2013.01); *H04L 63/0478* (2013.01)

(58) Field of Classification Search
CPC . H04L 9/0618; H04L 9/0822; H04L 63/0478; G06F 21/602
See application file for complete search history.

(56) References Cited

U.S. PATENT DOCUMENTS

| | | | |
|---|---|---|---|
| 2010/0208889 A1* | 8/2010 | Humphrey | H04L 9/0894 380/278 |
| 2013/0208893 A1* | 8/2013 | Shablygin | H04L 9/0894 380/277 |
| 2016/0323250 A1* | 11/2016 | Winter | H04W 12/033 |
| 2018/0191506 A1* | 7/2018 | Vilvovsky | H04L 9/14 |
| 2018/0315044 A1* | 11/2018 | Schukai | G06F 16/1837 |
| 2019/0303031 A1* | 10/2019 | Sabourin | G06F 3/0604 |
| 2020/0195425 A1* | 6/2020 | Mistry | H04L 63/123 |
| 2020/0250327 A1* | 8/2020 | Naraidoo | G06F 11/1464 |
| 2020/0274692 A1* | 8/2020 | Simon | H04L 9/0631 |

* cited by examiner

*Primary Examiner* — Carl G Colin
*Assistant Examiner* — Zhe Liu
(74) *Attorney, Agent, or Firm* — Tanner IP, PLLC

(57) ABSTRACT

A system for protecting electronic information when stored 'at rest' in which the information is first encrypted into ciphertext and whereby the ciphertext is divided into two or more parts (fragments). The two or more fragments are stored in two or more completely independent computer networks and the encryption key used to encrypt the electronic information is stored in one of the independent computer networks and is not shared with any other independent network. A second encryption key, generated and managed within the same independent computer network as the first encryption key, is shared with authorized accessors of the electronic information and is used to encrypt a wrapper which contains one of the ciphertext fragments corresponding to the electronic information and the resulting ciphertext is itself divided into two or more fragments for the purpose of transporting the enveloped ciphertext fragment to the one or more other independent networks.

14 Claims, 11 Drawing Sheets

Customer Logging Into an eRetailer Mobile Application Using a Digital
Driver's License Issued by a State or National Government
Step 4 - eRetailer Customer Identity Verification (Account Log-In)
Intra-Node Response Relay

DATA SECURITY USING FRAGMENTED CIPHERTEXT

This application claims priority to U.S. Provisional Patent Application No. 63/144,833, filed Feb. 2, 2021, and entitled "Quantum-Resistant Data Security Using Fragmented Ciphertext," the entire contents of which are hereby incorporated by reference for all purposes.

BACKGROUND

The present subject matter relates to the field of cyber security, and more specifically, to protecting electronic data and establishing human identities in cyber space.

The cost of cyber-attacks for both governments and private businesses is ever increasing as demonstrated by the recent SolarWinds hack. For private commercial entities, the primary concern is the monetary and reputational cost associated with data theft. For governments, the costs are measured in terms of damage to national security. Both the 2014 Office of Personnel Management breach and the more recent SolarWinds hack perfectly illustrate the national security cost to the United States Government.

SUMMARY

This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter.

A system for protecting electronic information when stored 'at rest' is provided whereby the information is first encrypted into ciphertext and whereby the ciphertext is divided into two or more parts (fragments). The two or more fragments are stored in two or more completely independent computer networks and where the encryption key used to encrypt the protected electronic information is stored in one of the two or more independent computer networks and is not shared with any other independent network.

A second encryption key, generated and managed within the same independent computer network as the first encryption key, is shared with authorized accessors of the protected electronic information and is used to encrypt a (software) container which contains one of the ciphertext fragments corresponding to the protected electronic information and where the resulting ciphertext is itself divided into two or more fragments for the purpose of transporting the enveloped ciphertext fragment to the one or more other independent networks.

When the protected electronic information is required for use in its unencrypted form, the two or more ciphertext fragments are sent to and subsequently processed by the independent computer network that generated and maintains the first encryption key.

The unencrypted protected electronic information is never stored 'at rest' and is always ephemeral.

According to first aspects of the disclosure, a method for protecting electronically stored information is provided, including encrypting electronic data into ciphertext using a first encryption key; dividing the ciphertext into at least a first fragment and a second fragment; storing the first fragment on a first computer network; and storing the second fragment on a second computer network.

In embodiments, the first encryption key is stored on the first computer network and is not shared with the second computer network.

Embodiments may further include encrypting at least one of the first fragment or the second fragment using a second encryption key.

Embodiments may further include encrypting a wrapper that contains at least one of the first fragment or the second fragment using a second encryption key.

In embodiments, the second encryption key is generated and managed within the same computer network as the first encryption key.

In embodiments, the second encryption key is shared with authorized accessors of the electronic data Embodiments may further include transmitting the encrypted wrapper including the at least one of the first fragment or the second fragment to a computer network on which the other of the first fragment or the second fragment is stored.

Embodiments may further include encrypting the first fragment using a second encryption key, and encrypting the second fragment using a third encryption key.

In embodiments, when the electronic data is required for use in its unencrypted form, the at least first fragment and second fragment are sent to and subsequently processed by the computer network that generated and maintains the first encryption key.

In embodiments, after initial encryption, the electronic data is never stored unencrypted at rest.

These and other aspects of the invention will now become apparent to those of ordinary skill in the art upon review of the following description of embodiments of the invention in conjunction with the accompanying drawings.

BRIEF DESCRIPTION OF THE DRAWINGS

So that the manner in which the above-recited features of embodiments can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
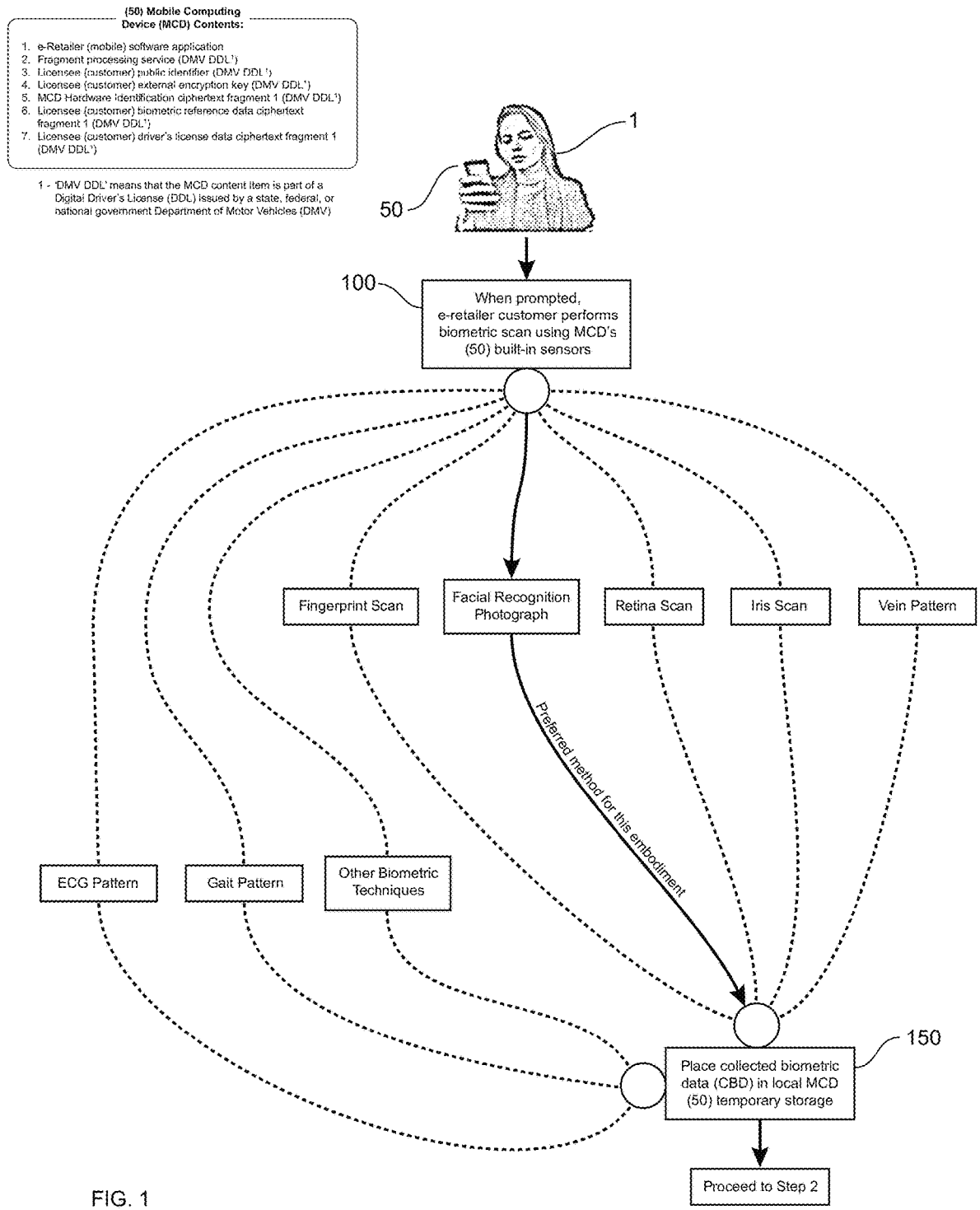
FIG. 1 depicts aspects of an exemplary user verification process, including an eRetailer Customer Identity Verification (Account Log-In) Request, according to aspects of the disclosure.

It is to be expressly understood that the description and drawings are only for the purpose of illustrating certain embodiments of the invention and are an aid for understanding. They are not intended to be a definition of the limits of the invention.

DETAILED DESCRIPTION

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a fragment" is a reference to one or more data fragment and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law.

Any feature of any embodiment discussed herein may be combined with any feature of any other embodiment discussed herein in some examples of implementation, unless otherwise specified.

The present subject matter relies on various techniques of "Fragmented Ciphertext" technology to protect electronic data. At its core, Fragmented Ciphertext technology leverages the fact that the ciphertext representing encrypted data must be completely intact before any decryption algorithm can successfully extract human-readable text data, images, binary data making up executable software, and other data considered sensitive or susceptible to targeting by nation-state or criminal hackers.

As variously described herein, and the other examples set forth in U.S. Provisional Patent Application No. 63/144,833, electronic data may be encrypted with an AES 'internal' key that is stored inside one of two independently managed bastion-protected cloud networks. The cybersecurity design is equivalent to those employed by the largest financial intuitions. These institutions employ defense in depth, enabling secure public internet-facing online banking websites. The challenge of operating public internet-facing websites where access to sensitive financial data is required is by and large successfully met with these designs.

After initial encryption, the resulting ciphertext is divided into two fragments. Fragment 1 is stored in one network and fragment is stored in another network. For transport, the first fragment is placed in a container which is encrypted with another 'external' key. The second fragment is placed in an inner container which is placed in another, outer container which is then encrypted with a third encryption key. This approach accounts for the possibility that a nation-state adversary might intercept both fragments in transport should internet infrastructure outside our control become compromised. They would be faced with the challenge of decrypting data secured by as many as 4 levels of encryption—the standard TLS encryption (https), the first key involved in encrypting the original sensitive data (1), the second key securing the first fragment in transport, and the third key securing the (wrapped) second fragment in transport. To further increase system entropy, the two transport packages are sent through two different paths which are part of a 'security triangle'. This serves as a security measure but also enables the collection of twice as much forensic data as is currently available to financial institutions when nation-state or criminal hackers probe their networks. On each transaction, we change both the encryption key used to secure the original sensitive data in step (2) and the external keys used for transport.

Fragmented Ciphertext systems as described herein provide a simple solution for preventing successful supply chain attacks such as the recent SolarWinds incident. We accomplish this protection by diversifying the network management tools used within each of the two independent networks. For example, if a SolarWinds product is used in one network, a tool with equivalent capability from a different vendor would be used by another network. This approach also applies to the respective cloud infrastructures. One network might be hosted using one infrastructure, and another network might be hosted using a different infrastructure. If either of the cloud providers is catastrophically breached, the other would maintain data security. This has the added benefit of strengthening the national security industrial base.

FIG. 1 depicts aspects of an exemplary user verification process, including an eRetailer Customer Identity Verification (Account Log-In) Request, according to aspects of the disclosure. As shown in FIG. 1, a user 1 may submit an eRetailer Customer Identity Verification (Account Log-In) Request via mobile computing device (MCD) 50. MCD 50 maying include, for example, e-Retailer (mobile) software application, Fragment processing service (DMV DDL1), Licensee (customer) public identifier (DMV DDL1), Licensee (customer) external encryption key (DMV DDL1), MCD Hardware Identification ciphertext fragment 1 (DMV DDL1), Licensee (customer) biometric reference data ciphertext, fragment 1 (DMV DDL1), Licensee (customer) driver's license data ciphertext fragment 1, (DMV DDL1), as discussed further below.

When prompted, e-retailer customer performs biometric scan 100 using MCD's (50) built-in sensors, e.g. ECG Pattern, Gait Pattern, Fingerprint Scan, Facial Recognition Photograph, Retina Scan, Iris Scan, Vein Pattern, or Other Biometric Techniques. Collected biometric data (CBD) may be placed in local MCD (50) temporary storage at 150.

Figure 2:
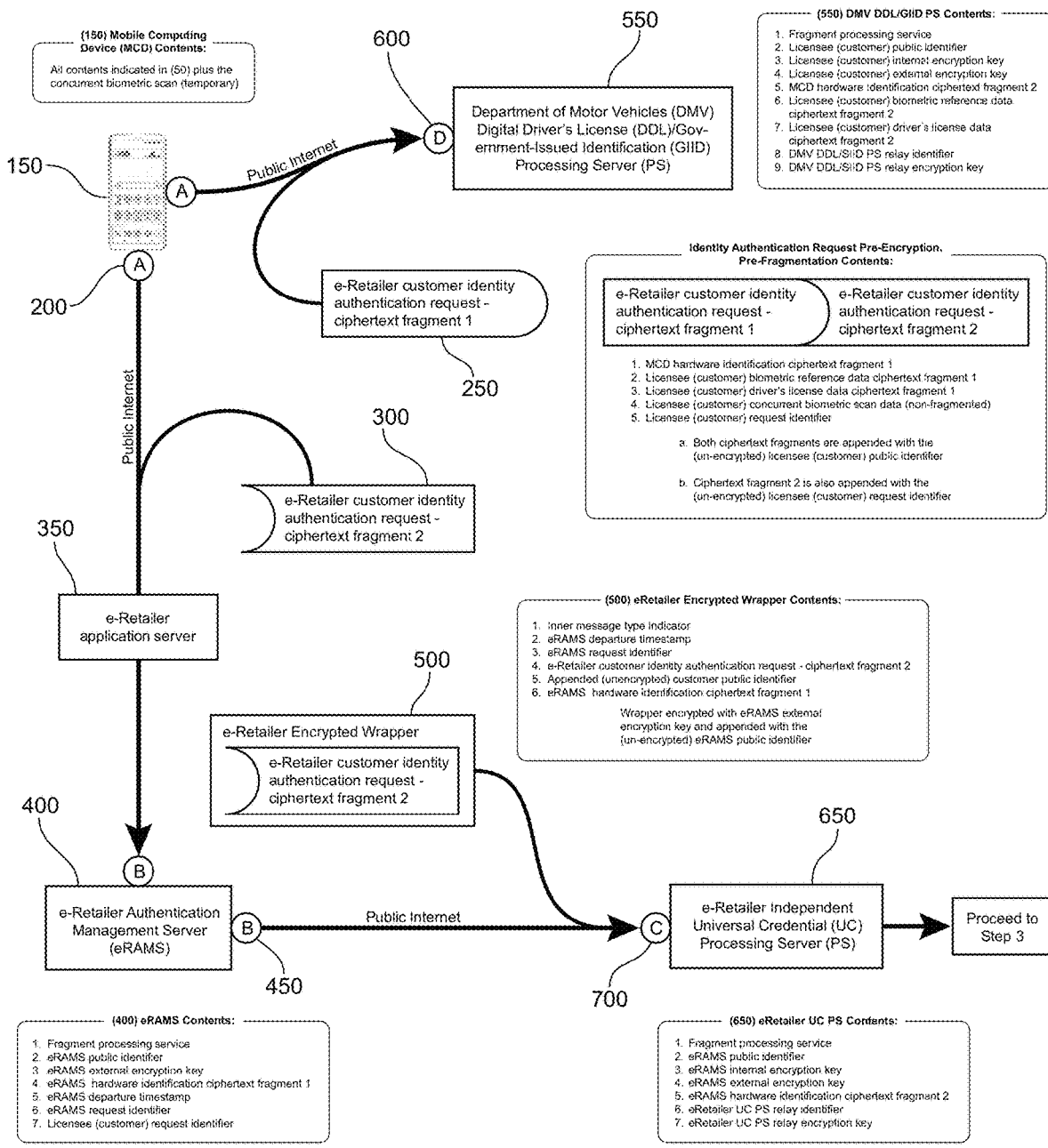
FIG. 2 depicts further aspects of an exemplary user verification process, including an eRetailer Customer Identity Verification (Account Log-In) Request, according to aspects of the disclosure.

The process may continue, for example with Step 2, shown in FIG. 2.

Figure 3:
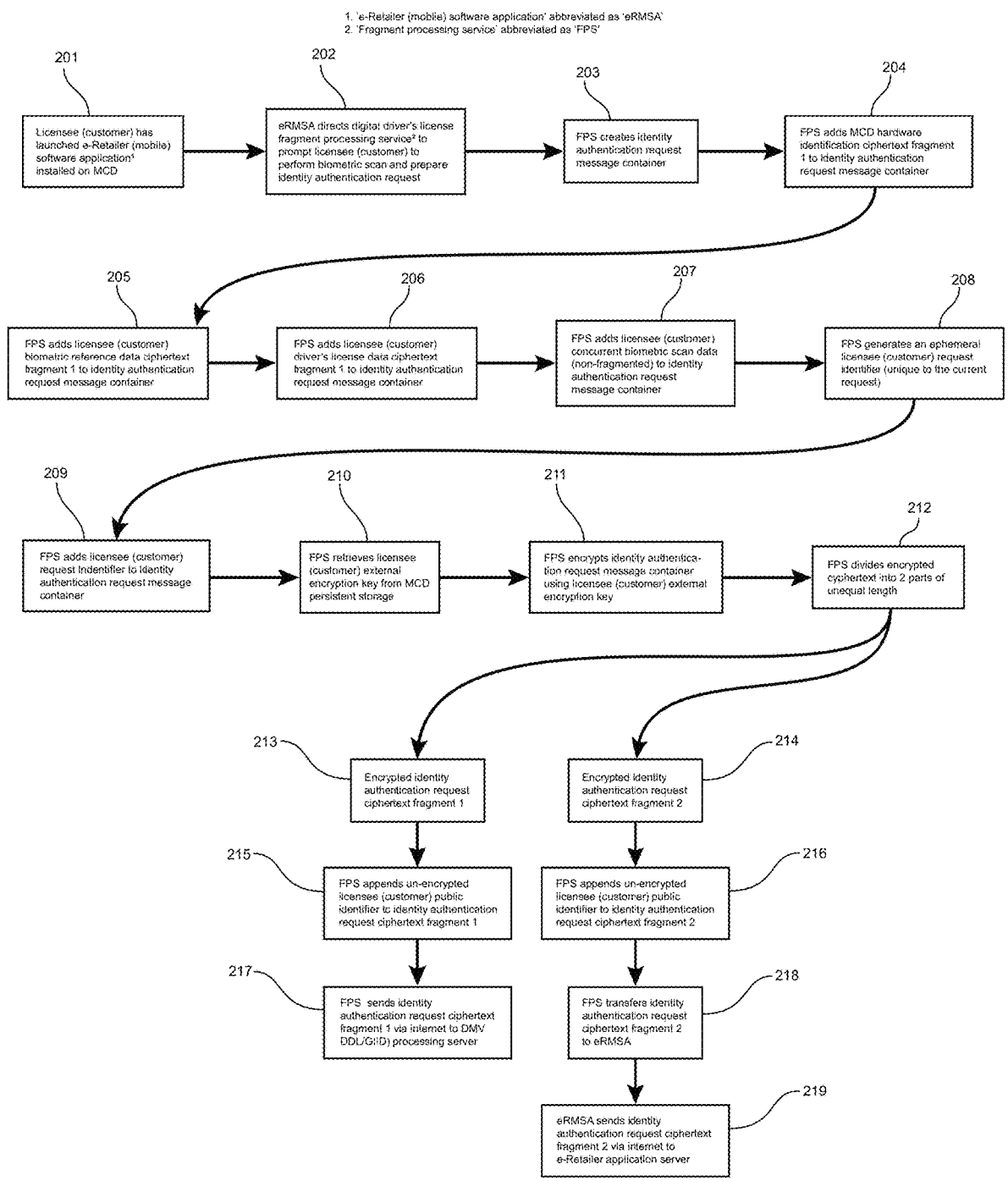
FIG. 3 depicts further aspects of an exemplary user verification process, including a Fragmented Customer Identity Verification Request, according to aspects of the disclosure.

FIG. 2 depicts further aspects of an exemplary user verification process, including an eRetailer Customer Identity Verification (Account Log-In) Request, according to aspects of the disclosure. As shown in FIG. 2, the Mobile Computing Device (MCD) Contents 150 may include, for example, all contents indicated in (50) plus the concurrent biometric scan (temporary). The MCD 50 may generate process A at step 200, further details of which are shown in FIG. 3, in which a fragmented authentication process is begun. As discussed further herein, Identity Authentication Request Pre-Encryption, Pre-Fragmentation Contents may include an e-Retailer customer identity authentication request (ciphertext fragment 1) and an e-Retailer customer identity authentication request (ciphertext fragment 2).

In embodiments, ciphertext fragment 1 may include, for example, MCD hardware identification, Licensee (customer) biometric reference data, Licensee (customer) driver's license data, Licensee (customer).

Both ciphertext fragments may be appended with (unencrypted) licensee (customer) public identifier, and ciphertext fragment 2 may also be appended with an (un-encrypted) licensee (customer) request identifier.

Generally speaking, request 200, along with e-Retailer customer identity authentication request 300 (including ciphertext fragment 2), may be transmitted to, or received by, an e-Retailer application server at 350. This may be routed through e-Retailer Authentication Management Server (eRAMS) 400 and transmitted 450, e.g. via public internet, along with e-Retailer Encrypted Wrapper 500 including e-Retailer customer identity authentication request-ciphertext fragment 2, to e-Retailer Independent Universal Credential (UC) Processing Server (PS) 650, the combined receipt of which is represented by step 700.

eRAMS 400 may include, for example, Fragment processing service, eRAMS public identifier, eRAMS external encryption key, eRAMS hardware identification ciphertext fragment 1, eRAMS departure timestamp, eRAMS request identifier, and Licensee (customer) request identifier.

eRetailer Encrypted Wrapper 500 may include, for example, an inner message type indicator, eRAMS departure timestamp, eRAMS request identifier, e-Retailer customer identity authentication request-ciphertext fragment 2, Appended (unencrypted) customer public identifier, and eRAMS hardware identification ciphertext fragment 1. In embodiments, the wrapper may be encrypted with eRAMS external encryption key and appended with the (un-encrypted) eRAMS public identifier.

eRetailer UC PS 650 may include, for example, Fragment processing service, eRAMS public identifier, eRAMS internal encryption key, eRAMS external encryption key, eRAMS hardware identification ciphertext fragment 2, eRetailer UC PS relay identifier, and eRetailer UC PS relay encryption key.

Concurrently, MCD 50 may cause communication of request 600 including e-Retailer customer identity authentication request 250 (ciphertext fragment 1). Request 600 may be received by a governmental or other public identification issuing authority, such as Department of Motor Vehicles (DMV) Digital Driver's License (DDL)/Government Issued Identification (GIID) Processing Server (PS), at 550. The DMV DDL/GIID PS (or other identification issuing authority) may include, for example, Fragment processing service, Licensee (customer) public identifier, Licensee (customer) internal encryption key, Licensee (customer) external encryption key, MCD hardware Identification ciphertext fragment 2, Licensee (customer) biometric reference data, ciphertext fragment 2, Licensee (customer) driver's license data, ciphertext fragment 2, DMV DDL/SIID PS relay identifier, and DMV DDL/SIID PS relay encryption key.

FIG. 3 depicts further aspects of an exemplary user verification process, including a Fragmented Customer Identity Verification Request, according to aspects of the disclosure. As shown in FIG. 3, procedure "A", e.g. generally represented at step 200 shown in FIG. 2, may begin with 201 in which a Licensee (customer) has launched e-Retailer (mobile) software application installed on MCD. At 202, eRMSA directs a digital driver's license fragment processing service (FPS) to prompt the licensee (customer) to perform a biometric scan and prepare an identity authentication request.

At 203, the FPS creates an identity authentication request message container, and at 204 the FPS adds MCD hardware identification ciphertext fragment 1 to the identity authentication request message container.

At 205, the FPS may add licensee (customer) biometric reference data ciphertext fragment 1 to the identity authentication request message container, and at 206 the FPS may add licensee (customer) driver's license data ciphertext fragment 1 to the identity authentication request message container.

At 207, FPS adds licensee (customer) concurrent biometric scan data (non-fragmented) to identity authentication request message container, and at 208 FPS generates an ephemeral licensee (customer) request identifier (unique to the current request).

At 209, FPS adds licensee (customer) request identifier to identity authentication request message container, and at 210 FPS retrieves licensee (customer) external encryption key from MCD persistent storage.

At 211, FPS encrypts identity authentication request message container using licensee (customer) external encryption key, and at 212 FPS divides encrypted cyphertext into two parts of unequal length.

At 213 Encrypted identity authentication request ciphertext fragment 1 is separated and FPS appends un-encrypted licensee (customer) public identifier to identity authentication request ciphertext fragment 1 at 215. At 217 FPS sends identity authentication request ciphertext fragment 1 via internet to DMV DDL/GIID) processing server.

At 214 Encrypted identity authentication request ciphertext fragment 2 is separated and FPS appends un-encrypted licensee (customer) public identifier to identity authentication request ciphertext fragment 2 at 216. At 218 FPS transfers identity authentication request ciphertext fragment 2 to eRMSA, and at 219 eRMSA sends identity authentication request ciphertext fragment 2 via internet to e-Retailer application server.

Figure 4:
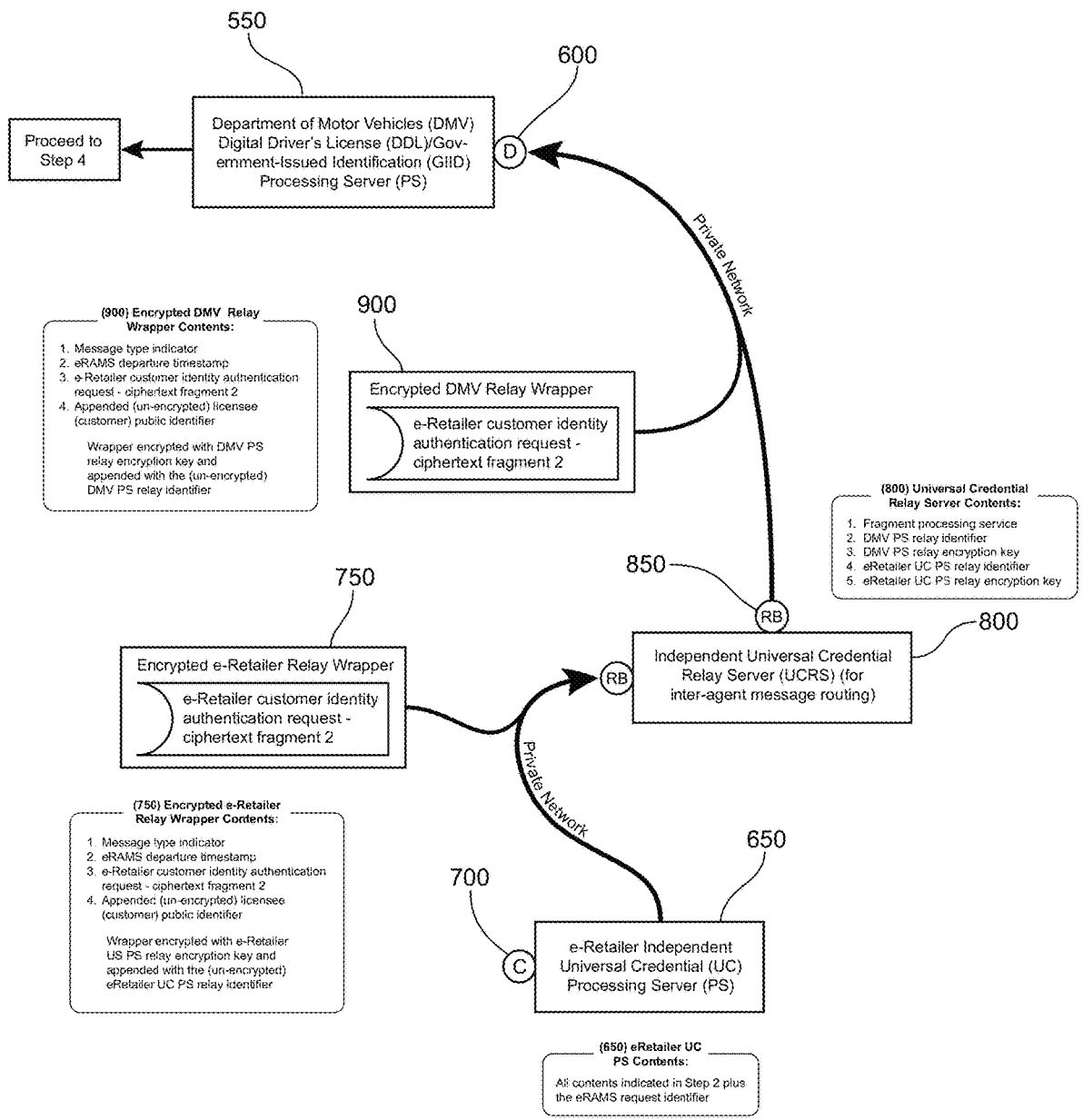
FIG. 4 depicts further aspects of an exemplary user verification process, including an eRetailer Customer Identity Verification (Account Log-In) Intra-Node Request Relay, according to aspects of the disclosure.

Returning to FIG. 2, the process may continue from the e-Retailer Independent Universal Credential (UC) Processing Server (PS) at 650, for example with Step 3, shown in FIG. 4.

FIG. 4 depicts further aspects of an exemplary user verification process, including an eRetailer Customer Identity Verification (Account Log-In) Intra-Node Request Relay, according to aspects of the disclosure. As shown in FIG. 4, the e-Retailer Independent Universal Credential (UC) Processing Server (PS) may include all contents indicated in FIG. 2 Step 2 plus an eRAMS request identifier.

The e-Retailer Independent Universal Credential (UC) Processing Server (PS) may cause communication of such information, along with an Encrypted e-Retailer Relay Wrapper 750 via a private network to Independent Universal Credential Relay Server (UCRS) 800 (for inter-agent message routing). In general, the Encrypted e-Retailer Relay Wrapper 750 may include e-Retailer customer identity authentication request (ciphertext fragment 2). More specifically, Message type indicator, eRAMS departure timestamp, e-Retailer customer identity authentication request (ciphertext fragment 2), Appended (un-encrypted) licensee (customer) public identifier In embodiments, the Wrapper 750 may be encrypted with e-Retailer US PS relay encryption key and appended with the (un-encrypted) eRetailer UC PS relay identifier.

The Universal Credential Relay Server 800 may include, for example, a Fragment processing service, DMV PS relay identifier, DMV PS relay encryption key, eRetailer UC PS relay identifier, and eRetailer UC PS relay encryption key.

At 850, UCRS 800 may cause communication of Encrypted DMV Relay Wrapper 900 to Department of Motor Vehicles (DMV) Digital Driver's License (DDL)/Government-Issued Identification (GIID) Processing Server (PS) 550. Encrypted DMV Relay Wrapper 900 may generally include e-Retailer customer identity authentication request (ciphertext fragment 2). More specifically, Encrypted DMV Relay Wrapper 900 may include a Message type indicator, eRAMS departure timestamp, e-Retailer customer identity authentication, request-ciphertext fragment 2, Appended (un-encrypted) licensee, (customer) public identifier Additional details regarding this process are shown in FIG. 5.

Figure 5:
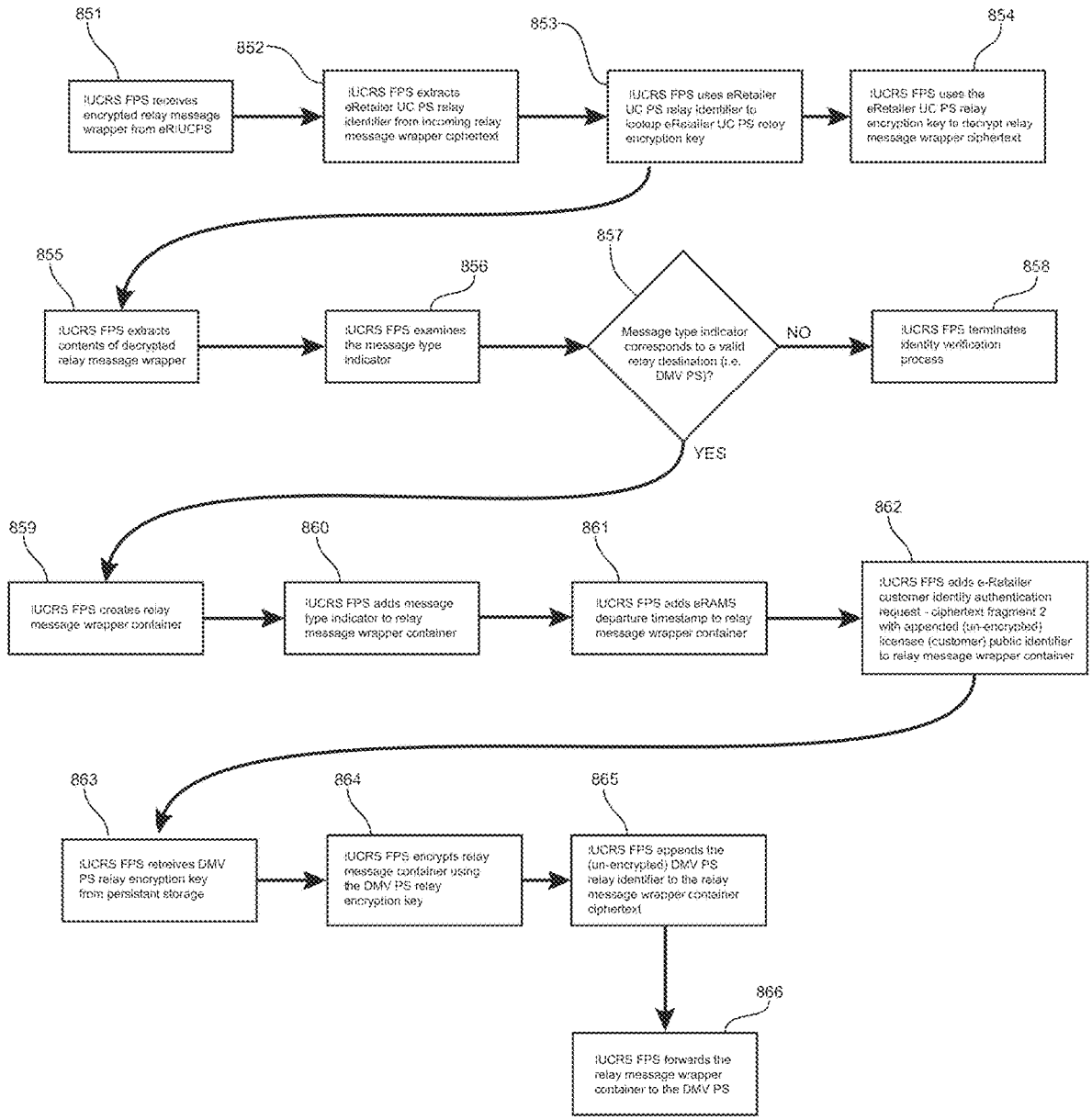
FIG. 5 depicts further aspects of an exemplary user verification process, including an Independent Universal Credential Processing Server process, according to aspects of the disclosure.

As shown in FIG. 5, an Independent universal credential relay server (IUCRS) fragment processing service (FPS) receives encrypted relay message wrapper from the e-Retailer independent universal credential processing server (eRIUCPS) at 851. At 852, the IUCRS FPS extracts eRetailer UC PS relay identifier from incoming relay message wrapper ciphertext, and the IUCRS FPS uses eRetailer UC PS relay identifier to lookup eRetailer UC PS relay encryption key at 853.

Proceeding from 853, the IUCRS FPS uses the eRetailer UC PS relay encryption key to decrypt relay message wrapper ciphertext at 854, and extracts contents of decrypted relay message wrapper at 855.

At 856 IUCRS FPS examines the message type indicator, and determines at 857 whether the message type indicator corresponds to a valid relay destination (i.e. DMV PS). If NO, then the IUCRS FPS terminates identity verification process at 858. If YES, then the IUCRS FPS creates a relay message wrapper container at 859.

If a relay message wrapper container was created at 859, the process may proceed with 860, in which the IUCRS FPS adds a message type indicator to the relay message wrapper container.

In 861, the IUCRS FPS adds an eRAMS departure timestamp to the relay message wrapper container, and the IUCRS FPS adds an e-Retailer customer identity authentication request (ciphertext fragment 2) with appended (un-encrypted) licensee (customer) public identifier to the relay message wrapper container at 862.

At 863, the IUCRS FPS retreives DMV PS relay encryption key from persistent storage, and at 864 the IUCRS FPS encrypts the relay message container using the DMV PS relay encryption key.

At 865, the IUCRS FPS appends the (un-encrypted) DMV PS relay identifier to the relay message wrapper container ciphertext, and at 866 the IUCRS FPS forwards the relay message wrapper container to the DMV PS.

Returning to FIG. 4, in embodiments, the wrapper 900 may be encrypted with DMV PS relay encryption key and appended with the (un-encrypted) DMV PS relay identifier. As can be appreciated in looking at FIGS. 2 and 4, the Department of Motor Vehicles (DMV) Digital Driver's License (DDL)/Government-Issued Identification (GIID) Processing Server (PS) receives both ciphertext fragment 1 (see, FIG. 2, 250) and ciphertext fragment 2 (see, FIG. 4, 900). The process may continue, for example with Step 4, shown in FIG. 6.

Figure 6:
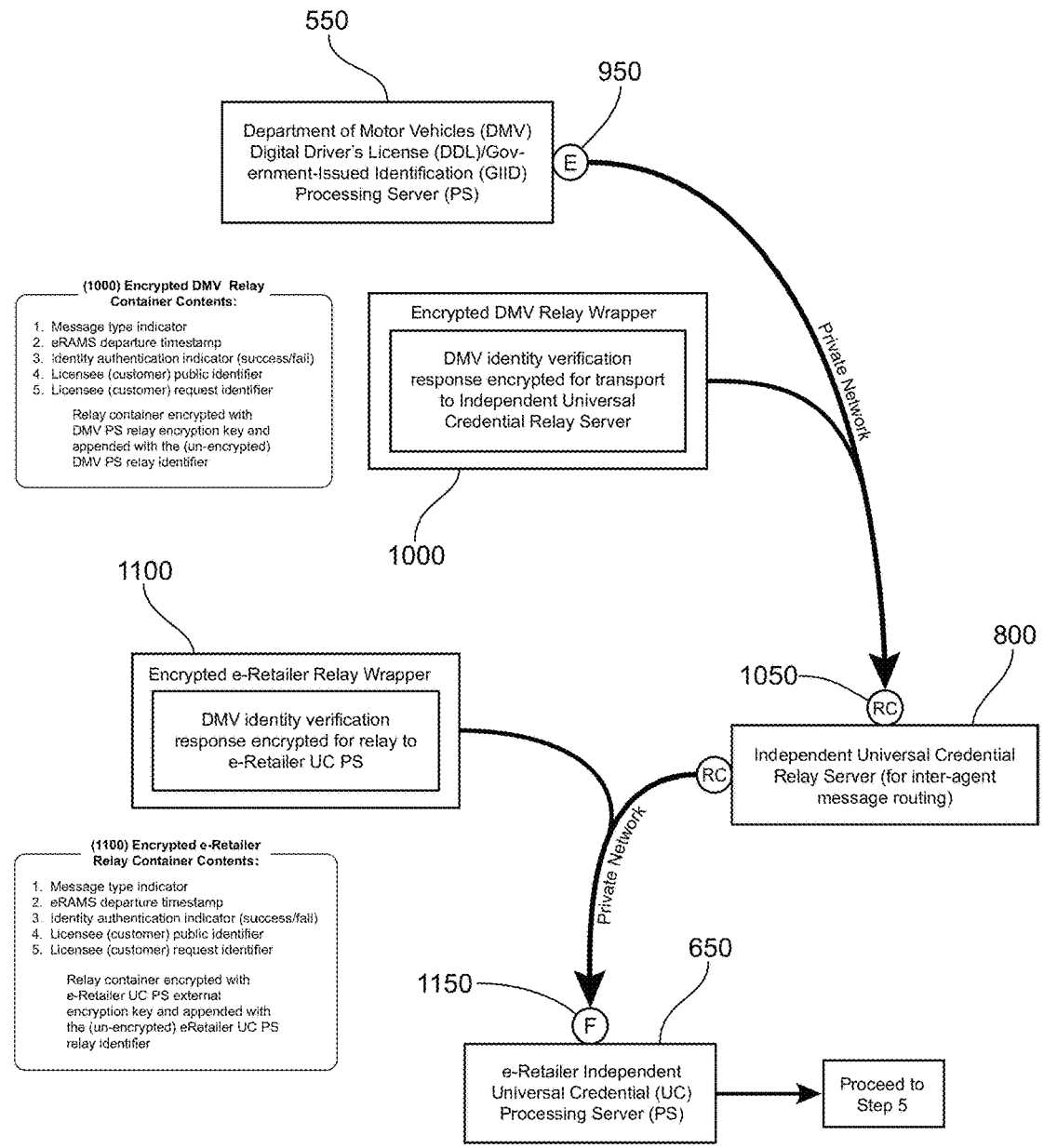
FIG. 6 depicts further aspects of an exemplary user verification process, including an eRetailer Customer Identity Verification (Account Log-In) Intra-Node Response Relay, according to aspects of the disclosure.

FIG. 6 depicts further aspects of an exemplary user verification process, including an eRetailer Customer Identity Verification (Account Log-In) Intra-Node Response Relay, according to aspects of the disclosure. As shown in FIG. 6, at 950 the Department of Motor Vehicles (DMV) Digital Driver's License (DDL)/Government-Issued Identification (GIID) Processing Server (PS) prepares and causes delivery of Encrypted DMV Relay Wrapper 1000 to Independent Universal Credential Relay Server 800 (for inter-agent message routing). The DMV identity verification response is encrypted for transport to Independent Universal Credential Relay Server, and may include, for example, a Message type indicator, eRAMS departure timestamp, Identity authentication indicator (success/fail), Licensee (customer) public identifier, and Licensee (customer) request identifier.

In embodiments, the Relay container may be encrypted with the DMV PS relay encryption key and appended with the (un-encrypted) DMV PS relay identifier.

Figure 7:
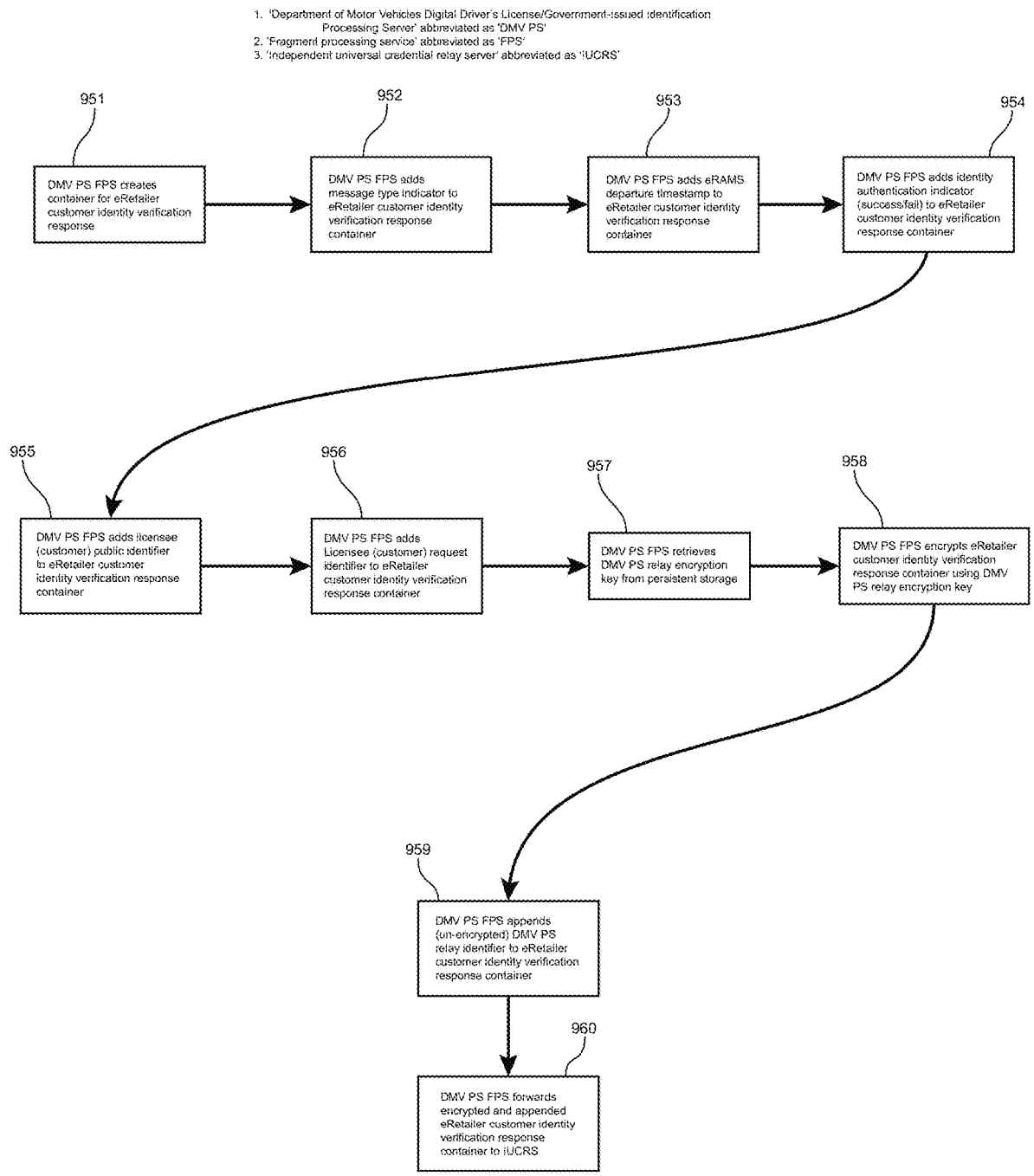
FIG. 7 depicts further aspects of an exemplary user verification process, including a Department of Motor Vehicles Processing Server Prepare Verification Response, according to aspects of the disclosure.

Additional details regarding this process are shown in FIG. 7. As shown in FIG. 7, the DMV PS FPS creates container for eRetailer customer identity verification response at 951, and adds a message type indicator to eRetailer customer identity verification response container at 952.

At 953, DMV PS FPS adds eRAMS departure timestamp to eRetailer customer identity verification response container, and at 954 DMV PS FPS adds identity authentication indicator (success/fail) to eRetailer customer identity verification response container.

At 955, DMV PS FPS adds licensee (customer) public identifier to eRetailer customer identity verification response container, and at 956 DMV PS FPS adds Licensee (customer) request identifier to eRetailer customer identity verification response container.

At 957, DMV PS FPS retrieves DMV PS relay encryption key from persistent storage, and at 958 DMV PS FPS encrypts eRetailer customer identity verification response container using DMV PS relay encryption key.

At 959, DMV PS FPS appends (un-encrypted) DMV PS relay identifier to eRetailer customer identity verification response container, and at 960 DMV PS FPS forwards encrypted and appended eRetailer customer identity verification response container to IUCRS.

Returning to FIG. 6, Independent Universal Credential Relay Server 800 prepares and provides Encrypted e-Retailer Relay Wrapper 1100 to e-Retailer Independent Universal Credential (UC) Processing Server (PS) 650 at 1150. In general, the Encrypted e-Retailer Relay Wrapper 1100 may include DMV identity verification response encrypted for relay to e-Retailer UC PS. More specifically, the wrapper 1100 may include a Message type indicator, eRAMS departure timestamp, Identity authentication indicator (success/fail), Licensee (customer) public identifier, and Licensee (customer) request identifier.

In embodiments, the e-Retailer Relay Wrapper 1100 may be encrypted with an e-Retailer UC PS external encryption key and appended with the (un-encrypted) eRetailer UC PS relay identifier.

Figure 8:
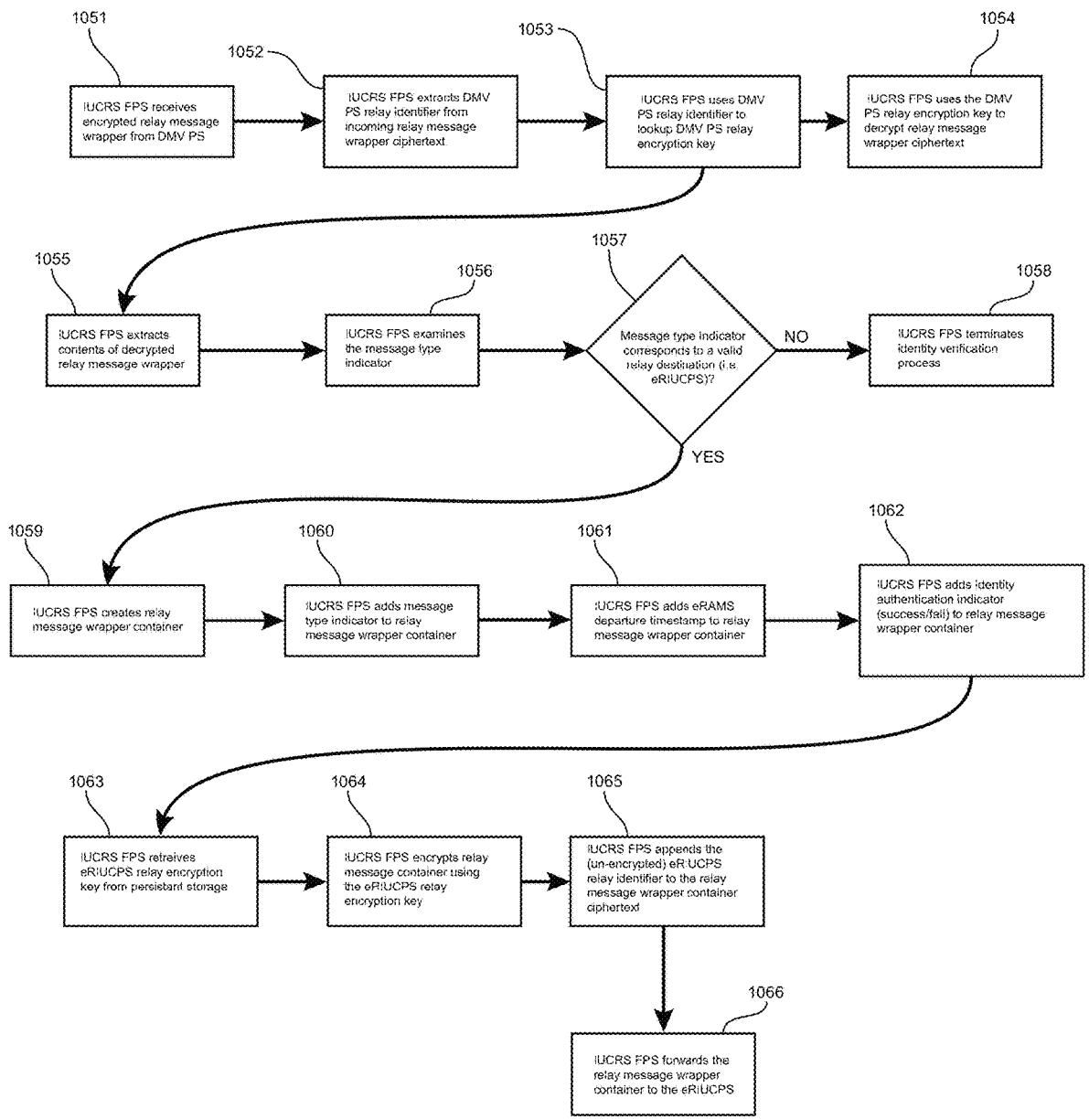
FIG. 8 depicts further aspects of an exemplary user verification process, including another Independent Universal Credential Processing Server process, according to aspects of the disclosure.

Additional details regarding related processes are shown in FIG. 8. As shown in FIG. 8, the IUCRS FPS receives encrypted relay message wrapper from DMV PS at 1051, and extracts DMV PS relay identifier from incoming relay message wrapper ciphertext at 1052. The IUCRS FPS uses DMV PS relay identifier to lookup DMV PS relay encryption key at 1053, and uses the DMV PS relay encryption key to decrypt relay message wrapper ciphertext at 1054.

At 1055, the IUCRS FPS extracts contents of decrypted relay message wrapper, and examines the message type indicator at 1056.

At 1057 a determination is made regarding whether the message type indicator corresponds to a valid relay destination (i.e. eRIUCPS). If NO, then the IUCRS FPS terminates identity verification process 1058. If YES, then the IUCRS FPS creates a relay message wrapper container at 1059.

The IUCRS FPS adds a message type indicator to the relay message wrapper container at 1060, and adds an eRAMS departure timestamp to the relay message wrapper container at 1061.

The IUCRS FPS adds Identity authentication indicator (success/fail) to relay message wrapper container at 1062, and retrieves eRIUCPS relay encryption key from persistent storage at 1063.

The IUCRS FPS encrypts the relay message container using the eRIUCPS relay encryption key at 1064, appends the (un-encrypted) eRIUCPS relay identifier to the relay message wrapper container at 1065, and forwards the relay message wrapper container to the eRIUCPS at 1066.

Returning to FIG. 6, the Encrypted e-Retailer Relay Wrapper 1100 is received and processed by e-Retailer Independent Universal Credential (UC) Processing Server (PS) 650 at 1150. Further details regarding related processes are shown in FIG. 9.

Figure 9:
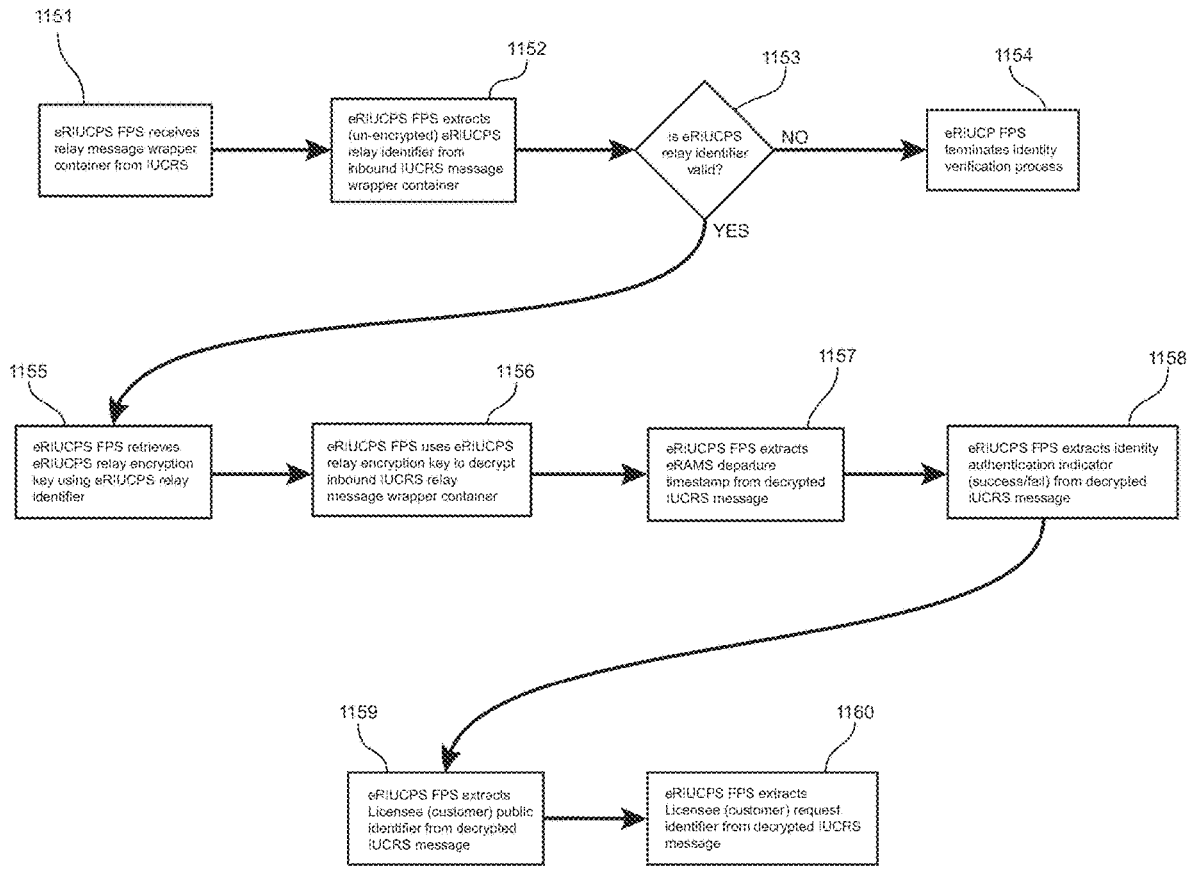
FIG. 9 depicts further aspects of an exemplary user verification process, including an eRetailer Independent Universal Credential Processing Server process, according to aspects of the disclosure.

As shown in FIG. 9, the e-Retailer independent universal credential processing server (eRIUCPS) fragment processing service (FPS) receives the relay message wrapper container from IUCRS at 1151 and extracts the (un-encrypted) eRIUCPS relay identifier from inbound IUCRS message wrapper container at 1152.

At 1153 a determination is made regarding whether the eRIUCPS relay identifier is valid. If NO, then the eRIUCP FPS terminates the identity verification process at 1154. If YES, then the eRIUCPS FPS retrieves the eRIUCPS relay encryption key using the eRIUCPS relay identifier at 1155.

The eRIUCPS FPS uses eRIUCPS relay encryption key to decrypt inbound IUCRS relay message wrapper container at 1156, and extracts eRAMS departure timestamp from decrypted IUCRS message at 1157.

The eRIUCPS FPS extracts identity authentication indicator (success/fail) from decrypted IUCRS message at 1158, extracts Licensee (customer) public identifier from decrypted IUCRS message at 1159, and extracts Licensee (customer) request identifier from decrypted IUCRS message at 1160.

Figure 10:
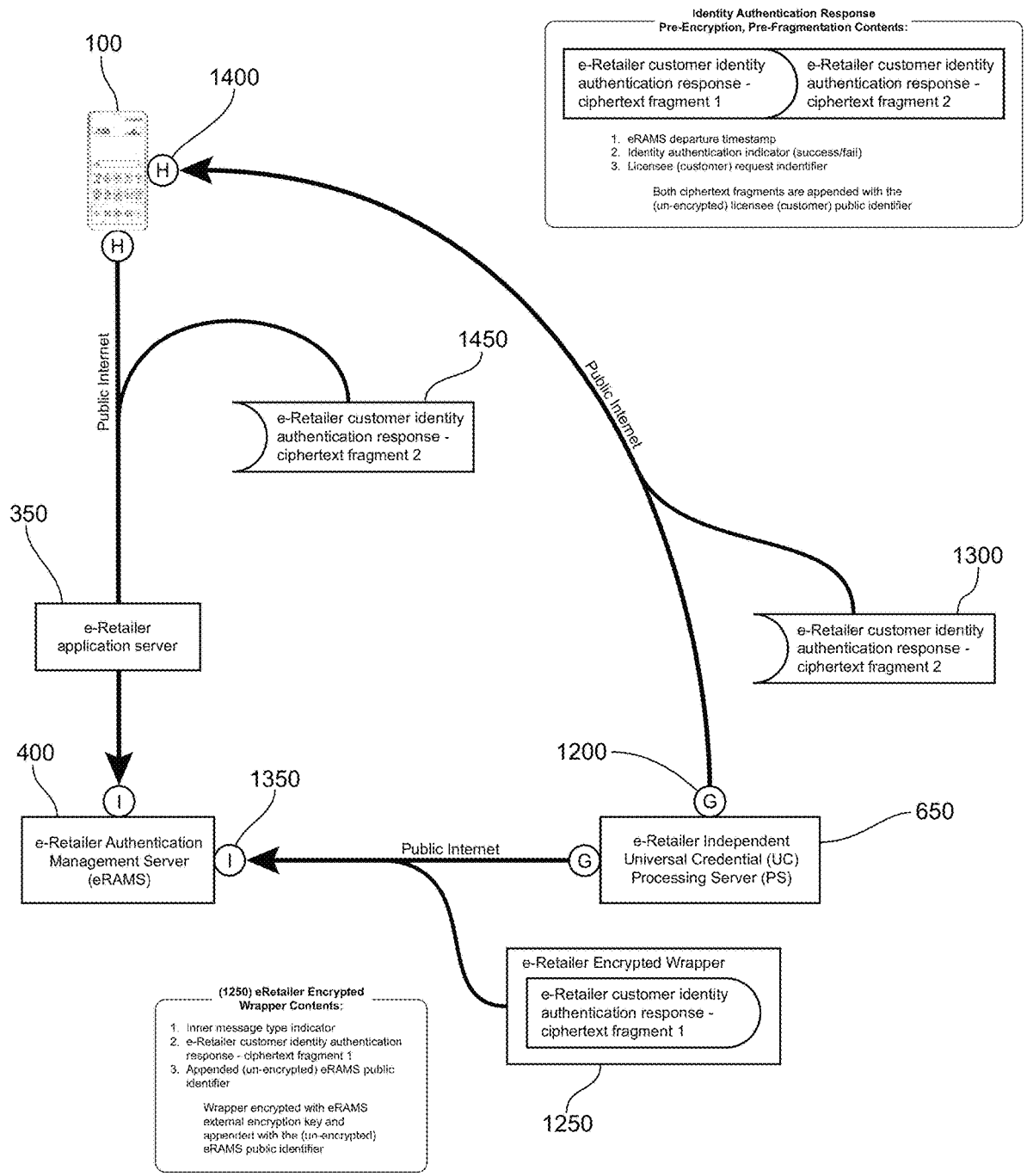
FIG. 10 depicts further aspects of an exemplary user verification process, including an eRetailer Customer Identity Verification (Account Log-In) Response, according to aspects of the disclosure.

The process may continue, for example with Step 5, shown in FIG. 10.

FIG. 10 depicts further aspects of an exemplary user verification process, including an eRetailer Customer Identity Verification (Account Log-In) Response, according to aspects of the disclosure. Generally speaking, the Identity Authentication Response Pre-Encryption, Pre-Fragmentation may include the e-Retailer customer identity authentication response (ciphertext fragment 1) and the e-Retailer customer identity authentication response (ciphertext fragment 2). In embodiments, they may also include an eRAMS departure timestamp, an Identity authentication indicator (success/fail), and a Licensee (customer) request identifier. Both ciphertext fragments may be appended with the (un-encrypted) licensee (customer) public identifier.

As shown in FIG. 10, the e-Retailer Independent Universal Credential (UC) Processing Server (PS) may generate and transmit e-Retailer Encrypted Wrapper 1250 to e-Retailer Authentication Management Server (eRAMS) 400. The e-Retailer Encrypted Wrapper 1250 may generally include e-Retailer customer identity authentication response (ciphertext fragment 1). More specifically, e-Retailer Encrypted Wrapper 1250 my include an Inner message type indicator, e-Retailer customer identity authentication, response (ciphertext fragment 1), and Appended (un-encrypted) eRAMS public identifier. In embodiments, the Wrapper 1250 may be encrypted with eRAMS external encryption key and appended with the (un-encrypted) eRAMS public identifier.

At 1200, e-Retailer Independent Universal Credential (UC) Processing Server (PS) may provide e-Retailer customer identity authentication response (ciphertext fragment 2) to the MCD. The MCD may receive and process this information at 1400, and provide e-Retailer customer identity authentication response (ciphertext fragment 2) to e-Retailer application server 350 and/or e-Retailer Authentication Management Server (eRAMS) 400.

Figure 11:
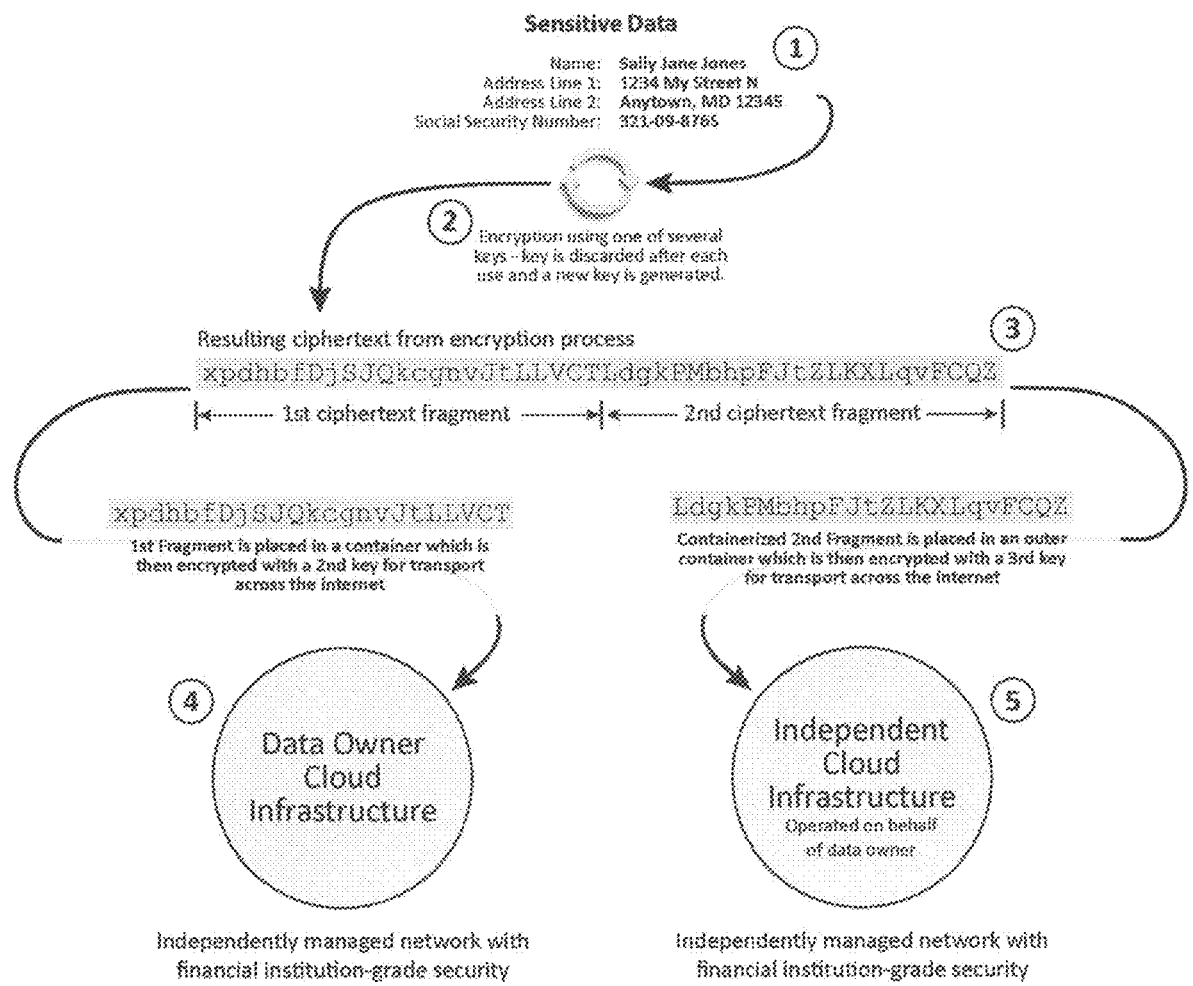
FIG. 11 depicts an exemplary process flow according to aspects of the disclosure.

As shown in FIG. 11, an exemplary work flow may include processing Sensitive Data, e.g. name, address, and other identifying information, which is encrypted using one of several keys. In embodiments, the key used to encrypt this data may be discarded after each use, with a new key being generated for any subsequent encryption and transport of the sensitive information. The resulting cyphertext may be divided into a 1st cyphertext fragment and a 2nd cyphertext fragment. The 1st cyphertext fragment may be placed in a container which is then encrypted with a 2nd key for transport across the internet. The 1st cyphertext fragment encrypted with the 2nd key may be transported to a data owner cloud structure, e.g. an independently managed network with financial institution-grade security. The 2nd cyphertext fragment may be placed in a placed in an outer container which is then encrypted with a 3rd key for transport across the internet. The 2nd cyphertext fragment encrypted with the 3rd key may be transported to an independent cloud infrastructure, e.g. a separate independently managed network with financial institution-grade security.

Thus, the two transport packages are sent through two different paths which are part of a 'security triangle'. This serves as a security measure but also enables the collection of twice as much forensic data as is currently available to financial institutions when nation-state or criminal hackers probe their networks. On each transaction, we change both the encryption key used to secure the original sensitive data and the external keys used for transport.

Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

While the foregoing is directed to embodiments of the present invention, other and further embodiments of the invention may be devised without departing from the basic scope thereof, and the scope thereof is determined by the claims that follow.

What is claimed is:

1. A method for securely authenticating electronically transported information, comprising:
    storing encrypted electronic data at a first network location;
    appending unencrypted data to the electronic data;
    encrypting the electronic data and the unencrypted data in a first data wrapper using a first external key;
    dividing the encrypted first data wrapper and its contents into a first fragment and a second fragment;
    sending the first fragment from the first network location to a second network location;
    sending the second fragment from the first network location to a third network location;
    at the third network location, appending supplemental electronic data to the second fragment, and encrypting the second fragment and the supplemental electronic data in a third data wrapper using a second external key;
    sending the encrypted third data wrapper and its contents from the third network location to the second network location;
    storing the first external key and the second external key at the second network location;
    storing a first internal key at the second network location; and
    at the second network location,
        decrypting and authenticating the encrypted third data wrapper using the second external key, and combining the first fragment and the second fragment,
        decrypting the combined first fragment and second fragment using the first external key, and
        authenticating the electronic data using the first internal key, wherein the first internal key is not shared with the first network location or the third network location.

2. The method of claim 1, further comprising authenticating a user based on the authenticated electronic data.

3. The method of claim 2, wherein the second network location includes a governmental service that further interacts with a universal authentication system in order to authenticate the user based on the authenticated electronic data.

4. The method of claim 1, wherein at least one of the encrypted electronic data and the unencrypted data includes biometric information.

5. The method of claim 4, wherein biometric information includes biometric reference data.

6. The method of claim 4, wherein biometric information includes current biometric data.

7. The method of claim 4, wherein biometric information includes biometric reference data and current biometric data.

8. The method of claim 1, wherein the second network location is an authentication service.

9. The method of claim 1, wherein the third network location is a service provider.

10. The method of claim 1, wherein the second network location is an authentication service and the third network location is a service provider, and the authentication service provides a user authentication to the service provider based on the authenticated electronic data.

11. The method of claim 1, wherein the supplemental electronic data includes a service provider identification.

12. The method of claim 1, wherein the first fragment is sent from the first network location to the second network location using a first network path, and the second fragment is sent from the first network location to the third network location using a second network path that is independent from the first network path.

13. The method of claim 1, wherein the second network location is maintained on a first network, and the third network location is maintained on a second network that is independent from the first network.

14. The method of claim 13, wherein the first network and the second network are separate, independently-protected cloud networks.

* * * * *